United States Patent

Katz

[15] 3,687,425
[45] Aug. 29, 1972

[54] PROCESS AND APPARATUS FOR HEAT AND/OR MASS TRANSFER BY DIRECT CONTACT

[72] Inventor: Robert Katz, 564 Church Ave., Woodmere, N.Y. 11598

[22] Filed: July 15, 1970

[21] Appl. No.: 55,069

Related U.S. Application Data

[63] Continuation-in-part of Ser. No. 730,851, May 21, 1968, Pat. No. 3,525,309.

[52] U.S. Cl.........261/114 R, 261/124, 261/DIG. 11
[51] Int. Cl. .............................................B01d 3/04
[58] Field of Search..................261/DIG. 4, 114, 124

[56] References Cited

UNITED STATES PATENTS

| | | |
|---|---|---|
| 24,543 | 6/1859 | Dickinson............261/DIG. 11 |
| 3,143,482 | 8/1964 | McLeod et al...............114 R/ |
| 3,464,679 | 9/1969 | Becker...................261/114 R |
| 3,489,506 | 1/1970 | Galstaun et al.........261/114 R |
| 3,445,093 | 5/1969 | Reder..........................261/89 |
| 599,202 | 2/1898 | Spoon, Jr.............261/DIG. 11 |

FOREIGN PATENTS OR APPLICATIONS

| | | |
|---|---|---|
| 346,820 | 1/1922 | Germany............261/DIG. 11 |
| 550,268 | 3/1923 | France................261/DIG. 11 |

*Primary Examiner*—Tim R. Miles
*Assistant Examiner*—Steven H. Markowitz
*Attorney*—Joseph Hirschmann

[57] ABSTRACT

Heat and/or mass interchange by direct contact between a liquid, such as water, and a gas, such as air, is effected by causing the gas to bubble through a layer or layers of the liquid, the liquid being caused to flow over a perforated pan or pans and the gas being forced through the perforations by being supplied at a pressure sufficient to overcome the hydrostatic heat of the liquid. Where a number of pans are employed, the liquid can flow over them in series in two or more streams in parallel. The process and apparatus are of particular value for the cooling of coolant water of air conditioning systems with the aid of air, for the cleaning of polluted air, for the scrubbing of gases with water or other liquids, and for the fractionation of mixture of liquids by means of air or other gas.

3 Claims, 3 Drawing Figures

Patented Aug. 29, 1972

Robert Katz
INVENTOR.

By *Joseph Hirschman*
ATTORNEY

PROCESS AND APPARATUS FOR HEAT AND/OR MASS TRANSFER BY DIRECT CONTACT

This application is a continuation-in-part of my copending application, Ser. No. 730,851, filed May 21, 1968, which was issued on Aug. 25, 1970, as U.S. Pat. No. 3,525,309.

The present invention relates to a process and apparatus for heat and/or mass interchange by direct contact between a liquid, such as water, and a gas, such as air.

The invention is of particular value for the cooling of the coolant water by means of air in the coolant re-circulating system of air conditioning apparatus, and will accordingly be described in detail as embodied therein by way of example, but it will be understood that the invention is applicable to other, especially industrial, operations requiring heat or mass interchange, as in scrubbers, fractionators, and the like, wherein the temperature relation between the liquid and gas may be the reverse of that prevailing in a coolant re-circulating system, i.e., the temperature of the gas may be higher than that of the liquid.

In the known devices for the transfer, for example, of heat from water to air, no satisfactory measures are provided, so far as I am aware, for taking account of the fact that the controlling resistance to the heat transfer is in the gas phase or from the gas film interface into the large body of gas.

In conventional devices for cooling, for example, of coolant water with air to enable its re-use, or for scrubbing gases with a liquid, a maximum area of contact between the liquid and gas is obtained by either spraying the liquid through the gas, or by providing a multiplication of liquid surface areas by causing the liquid to flow in thin streams, or by utilizing a fill material, such as ceramic rings, and wetting the surfaces thereof with the liquid so as to expose a large area of liquid surface for contact with the flowing gas. In these types of devices the object is to achieve the maximum contact by breaking up the liquid so as to obtain a large total exposed liquid surface area.

My investigations have established that these procedures do not adequately take account of the fact that gases, such as air, are much poorer conductors of heat than water, which is in part due to the low density of the gases (thus the density of air is about 1/900th that of water); and that creating fine droplets or thin films of air for example, is of greater effectiveness for heat transfer than creating fine droplets of thin films of water.

In addition, it is a thermodynamic requirement that the ratio by weight of water to air be in the range of 1 lb. of water to 1 lb. of air. It follows therefore, by virtue of the density difference that the volume of air is approximately 900 times the volume of water and that for equal droplet sizes it is possible to expose 900 times the surface if the air is dispersed into the water than if the water is dispersed into the air.

Also, in many types of known cooling towers, the great mass of the air is not penetrated by the water droplets, it being borne in mind that the water must not be too finely atomized when sprayed into the current of air because of excessive losses through entrainment of the fine particles in the discharged cooling air, the objectives and the procedures in the case of cooling a mass of water with air being quite different from that of moistening air with atomized water for humidifying purposes.

It is therefore important in the cooling of coolant water, that, while permitting a certain desirable amount of evaporation of water which results in the cooing of the main body of water, excessive loss of water through entrainment be prevented.

It is accordingly an object of the invention to provide an improved method and apparatus for the cooling of coolant water by means of air whereby efficient cooling of the water is effected without loss of excessive amounts thereof.

It is also an object of the invention to provide an improved method and apparatus of the kind indicated which has a high cooling capacity for a unit weight and volume of the apparatus, so that greater compactness in the apparatus and reduced operating costs are simultaneously achieved.

It is a further object of the invention to provide a process and apparatus whereby intimate contact between a liquid, such as water, of elevated temperature, and a cooling gas, such as air, is obtained by causing a multiplicity of small streams of air presenting what may be termed a large gas surface area, to flow through a flowing layer or layers of water.

Other objects and advantages of the invention will appear from the following description thereof.

In accordance with the present invention, it is not the water to be cooled that is distributed so as to provide a large surface area of contact, but rather the air which is, so to speak, "comminuted" or divided into streams or bubbles which are caused to pass from beneath through a more or less fixed layer or layers of coolant water. The practical effect of such an arrangement is that the air streams or bubbles are continuously distorted and become subject to turbulence created as they pass through the much denser layer or layers of liquid so that the interior of the air bubbles and streams are brought to the interface and thereby heat transfer is promoted.

The attached drawings illustrate exemplifications of the invention in the form of cooling apparatus for the coolant water of refrigerating or air conditioning systems.

In said drawing,

FIG. 2 illustrates a two-stage apparatus in which the cooling air passes in series through two cascading layers of water; while

Figure 1:
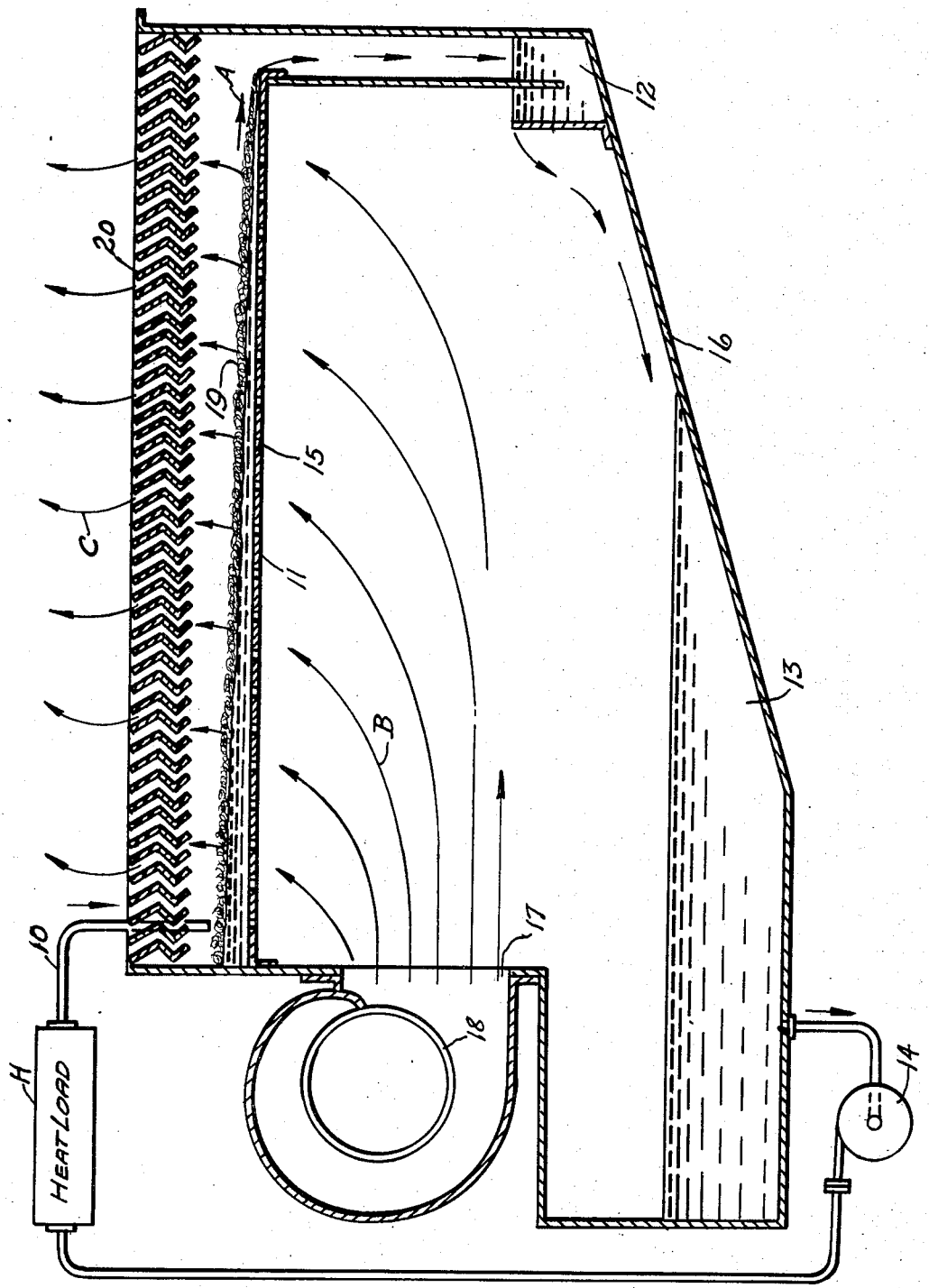
FIG. 1 shows a diagrammatic vertical section through a single-stage apparatus constructed in accordance with and illustrating the principles of the invention.

Referring more particularly to FIG. 1 of the drawings, the pipe 10 feeds the heated coolant water from the "heat load" H wherein it has absorbed heat, as in a refrigerating or air conditioning system, the water flowing onto a bed or pan 11 upon which the water collects in the form of a layer which flows from the left end of the pan to the right end, as indicated by the arrow A. The water flowing off pan 11 is discharged into the trap 12 from which it overflows into a sump 13. The water is withdrawn from the sump by pump 14 and is returned to the apparatus represented by the "heat load".

The water gradient on the pan is shown in exaggerated form in the drawing, and it will be understood that at the extreme right-hand end of the pan there may be provided a wall of such height that a body of water of substantial depth is retained on the pan.

The pan 11 may be of metal or plastic and is provided with a large number of small holes 15 for a purpose which will shortly be described. These holes can be much smaller than is indicated on the drawing and much more numerous. They may be equal in total area to about 15 to 50 percent and even more of the pan area.

As indicated on the drawing, the apparatus is contained within a casing 16 of metal or plastic which is provided at one side with an opening 17 through which enters cooling air, as indicated by the arrows B, forced into the apparatus by a centrifugal blower 18 operated by an electric motor in the usual manner.

The air is at such pressure that it overcomes the head of water on the pan, and passes through the openings 15 in he form of very thin streams or as a series of bubbles. As it passes through the layer of water, the latter is churned into a froth, as indicated at 19, which aids in the transfer of heat of the water to the air.

Entrained water is removed to a large extent from the outflowing air as it passes through the series of baffles 20 and the air is finally discharged into the atmosphere, as indicated by the arrows C.

Figure 2:
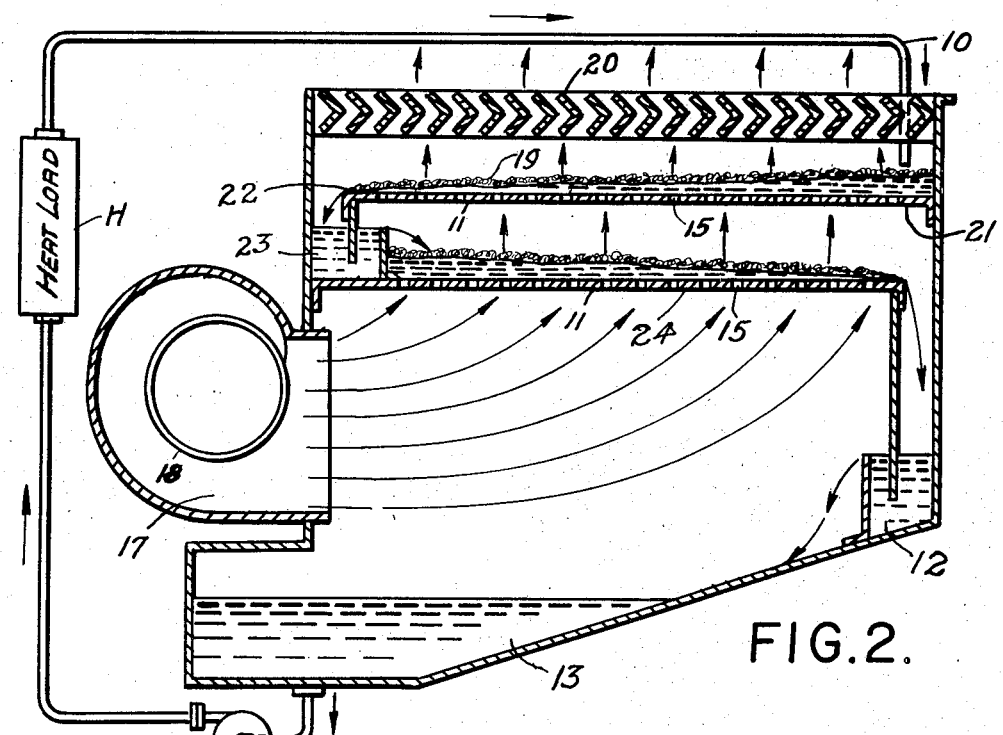

In the form of the invention illustrated in FIG. 2, the water deposited on the first pan 21 by pipe 10 overflows, as indicated at 22, into a water trap 23 and collects on the lower pan 24 from which it discharges into the trap 12, and then flows to the sump 13 from which it is returned by the pump to serve as the cooling agent for the apparatus represented by the "heat load" H.

Both of the pans are provided with perforations 15 as described hereinabove and after passing through the bed of water on the pan 24, the forced air flows in series through the openings 15 in the pan 21 and through the bed of water thereon; after which it flows through the baffles 20 into the atmosphere, as described above.

Figure 3:
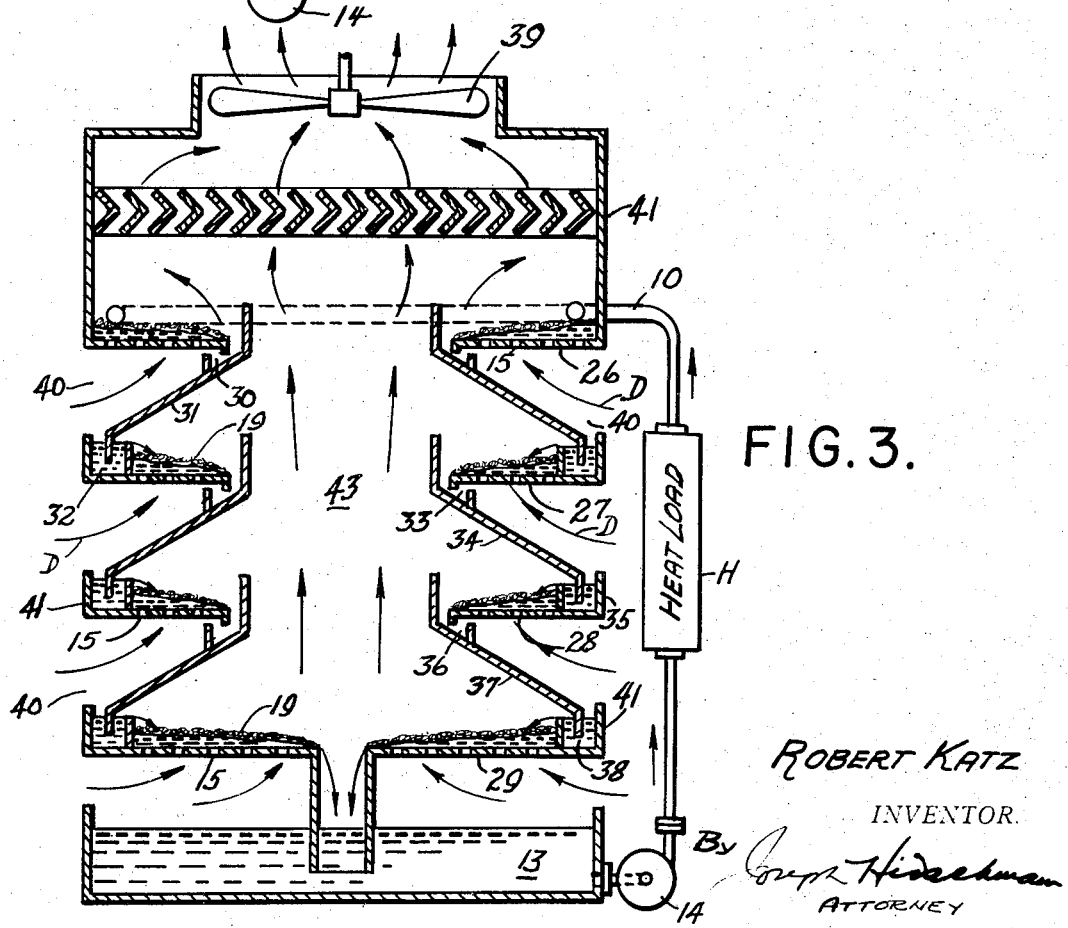
FIG. 3 shows a plurality of single stages through which the water cascades in series, the air flowing in parallel through the several stages.

FIG. 3 shows a cooling tower 25 in which the pans, instead of being rectangular or circular, as in FIGS. 1 and 2, are of annular shape. The pans are indicated at 26, 27, 28, and 29, the uppermost pan 26 receiving the heated coolant from the refrigerating or air conditioning or other apparatus H and overflowing into a trap 30 from which it flows down an imperforate conical shelf 31 and into the trap 32, from which it overflows onto the pan 27. The water then flows into the trap 33, down the imperforate conical shelf 34 and into the trap 35; thence onto the pan 28, the trap 36, the conical imperforate shelf 37, the trap 38 and onto the bottom pan 29. From the latter, the water overflows into the sump 13 from which it is delivered by the pump 14 to the apparatus providing the "heat load" H.

The pans are all provided with the small holes 15 for the passage of air therethrough, as explained above. In the form of the invention illustrated in FIG. 3, the flow of air is induced by a suction fan 39 driven by a suitable motor (not shown). Air inlets 40 spaced peripherally are provided in the casing 41 below each of the pans 29. If desired, the casing may be made of larger radius than, and be separate from the outer walls of the traps 32, 35 and 38, and of sump 13, to provide an air manifold which feeds all of the pans, an air inlet or inlets being provided at the bottom of such casing and, if necessary, additionally along its height.

The casing may be in the form of a cylindrical shell of which the outside walls of the traps 32, 35 and 38, and of sump 13, form an integral part; and it encloses, along with the traps, conical shelves and baffles, also a central region 43 which serves as a manifold for receiving the currents of air that have passed through the pans and beds of water thereon.

As will be readily understood, the suction fan 39 at the top of the apparatus sucks atmospheric air through the perforations 15 of the several pans. The air flows through the pans in parallel, i.e., the induced currents of air indicated by the arrows D each flows through only a single pan, so that the water on each pan receives air at atmospheric temperature. However, as will be readily apparent to those skilled in the art, the pans can be arranged to receive the air in series, as in FIG. 2; or, where a sufficiently larger number of pans are employed, certain of them may be in series, while others are in parallel; or two or more series-connected pans may be arranged in parallel.

It will be obvious that while I have described my invention hereinabove specifically as a heat exchange process and apparatus for the cooling of coolant water with air, it is equally well adapted to mass interchange, with or without simultaneous exchange of heat, in which case it can, for example, act as a scrubber of gases laden with a component soluble in a liquid solvent which will then replace the water of the herein illustrated embodiments, the solvent then preferably travelling in countercurrent fashion when a plurality of pans are arranged in series; or the process and apparatus can be used for removing from a mixture of liquids one or more of its more volatile components. The apparatus is also suitable for use as an air cleaner, the water then removing suspended particles from the air, and the sump then being provided with a drain valve or cock at its bottom for the periodic removal of collected particles which have settled thereon. Thus the apparatus can be used for cleaning furnace or incinerator flue gases with the aid of water, such gases then replacing the air in the embodiment above described.

I claim:

1. Process for heat and/or mass interchange between a liquid and a gas by direct contact, comprising the steps of providing a continuous body of substantially horizontally flowing liquid, and causing a gas to flow in a multitude of discrete small transverse streams through the body of liquid at a pressure differential between the spaces above and below the body of liquid, such that the gas enters the body of liquid from below its surface and emerges above the surface of the liquid, the liquid being caused to flow along a plurality of superposed horizontal paths joined by one or more inclined paths, the gas being caused to flow through all of the horizontal paths in parallel.

2. Apparatus for heat and/or mass interchange between a liquid and a gas, comprising a plurality of substantially horizontal pans, each containing a large number of small perforations at the bottom thereof, means for depositing a continuous body of liquid onto said pans to cause the same to flow over the perforations therein, means for creating a sufficient pressure differential between the spaces below and above the pans to cause the gas to flow through said perforations and through the continuous body of flowing liquid overlying the same, so that the gas passes through the bodies of liquid in a multitude of discrete small streams which emerge at the surface of the liquid, means for collecting the gas-treated liquid flowing off said pans, said perforated pans being arranged one above the other, means for directing liquid discharging from an upper pan onto a lower pan, and means for directing separate currents of gas to each of the pans, so that each current of gas passes through only a single pan, and a manifold for receiving the currents of discharging gas.

3. Apparatus for heat and/or mass interchange between a liquid and a gas, comprising a plurality of substantially horizontal pans, each containing a large number of small perforations at the bottom thereof, means for depositing a continuous body of liquid onto said pans to cause the same to flow over the perforations therein, means for creating a sufficient pressure differential between the spaces below and above the pans to cause the gas to flow through said perforations and through the continuous body of flowing liquid overlying the same, so that the gas passes though the bodies of liquid in a multitude of discrete small streams which emerge at the surfaces of the liquid, means for collecting the gas-treated liquid flowing off said pans, said perforated pans being arranged one above the other, means for directing liquid discharging from an upper pan onto a lower pan, said last mentioned means comprising an inclined imperforate plate connecting the discharge end of an upper pan with the receiving end of a lower pan to direct the liquid to the lower pan, said apparatus including a cylindrical housing, the superposed pans being of annular shape, the inclined imperforate plate being in the form of a frusto-conical guide, said cylinder having a central space leading to a discharge opening for the gas, the space above each of said pans leading to said central space.

* * * * *